United States Patent
Kitanaka

(10) Patent No.: US 8,593,843 B2
(45) Date of Patent: Nov. 26, 2013

(54) ELECTRIC POWER CONVERSION DEVICE CAPABLE OF SUPPRESSING ELECTRIC OSCILLATIONS

(75) Inventor: Hidetoshi Kitanaka, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 10 days.

(21) Appl. No.: 13/387,873

(22) PCT Filed: Sep. 28, 2010

(86) PCT No.: PCT/JP2010/005811
§ 371 (c)(1), (2), (4) Date: Jan. 30, 2012

(87) PCT Pub. No.: WO2011/039993
PCT Pub. Date: Apr. 7, 2011

(65) Prior Publication Data
US 2012/0147638 A1    Jun. 14, 2012

(30) Foreign Application Priority Data

Sep. 29, 2009  (WO) .................. PCT/JP2009/004961

(51) Int. Cl.
*H02M 3/24*  (2006.01)
*G05F 1/00*  (2006.01)

(52) U.S. Cl.
USPC ........................................... 363/95; 323/285

(58) Field of Classification Search
USPC ......... 363/95, 96, 97, 98, 131, 132, 133, 135, 363/136; 323/282, 283, 284, 285
See application file for complete search history.

(56) References Cited

U.S. PATENT DOCUMENTS

| | | | | |
|---|---|---|---|---|
| 5,077,652 A | * | 12/1991 | Faley | 363/97 |
| 8,106,620 B2 | * | 1/2012 | Kitanaka | 318/807 |
| 8,222,857 B2 | * | 7/2012 | Kitanaka | 318/811 |
| 2010/0156366 A1 | * | 6/2010 | Sakai et al. | 323/282 |

FOREIGN PATENT DOCUMENTS

| | | |
|---|---|---|
| JP | 2-211002 A | 8/1990 |
| JP | 3-98402 A | 4/1991 |
| JP | 11-299012 A | 10/1999 |
| JP | 2000-116189 A | 4/2000 |
| JP | 2003-199204 A | 7/2003 |
| WO | WO 2008026249 A1 * | 3/2008 |
| WO | WO 2009040884 A1 * | 4/2009 |

OTHER PUBLICATIONS

International Search Report (PCT/ISA/210) issued on Dec. 28, 2010, by Japanese Patent Office as the International Searching Authority for International Application No. PCT/JP2010/005811.

\* cited by examiner

*Primary Examiner* — Gary L Laxton
*Assistant Examiner* — Alex Torres-Rivera
(74) *Attorney, Agent, or Firm* — Buchanan Ingersoll & Rooney PC

(57) ABSTRACT

An electric power conversion device includes a power conversion circuit for receiving electric power from an overhead wire through an LC filter circuit composed of a reactor and a capacitor and converting the electric power to output and a control unit for controlling the power conversion circuit, wherein the control unit is provided with a delay unit for delaying the voltage across the capacitor so as to produce a first control signal, produces a second output voltage instruction from the first control signal and a first output voltage instruction specifying the magnitude of the output voltage of the converted power, and controls the power conversion circuit based on the second output voltage instruction.

4 Claims, 8 Drawing Sheets

ELECTRIC POWER CONVERSION DEVICE CAPABLE OF SUPPRESSING ELECTRIC OSCILLATIONS

TECHNICAL FIELD

The present invention relates to electric power conversion devices applied to an electric vehicle that receives electric power from a DC power supply, for example through an overhead wire (including a third rail or the like).

BACKGROUND ART

Generally, an electric vehicle receives electric power from an overhead wire through a pantograph and drives the motor to run, using the received electric power. It is known that the motor is controlled by an electric power conversion device in which an inverter, i.e., a DC-AC conversion circuit, converts the received electric power to three-phase AC power and supplies it to the motor.

Recently, because the performance of power storage elements such as a secondary battery and an electric double layer capacitor has been improved, a system is under development in which such an element is installed in the electric vehicle and the combination of the electric power in the power storage element and that from the overhead wire is used for driving the motor to run (refer, for example, to Patent Document 1). In such a system, in order to control the power flow between the overhead wire and the power storage element, used is an electric power conversion device including a DC-DC converter, i.e., a DC-DC conversion circuit.

PRIOR ART DOCUMENT

Patent Document

[Patent Document 1] Japanese Paten Laid-Open No. 2003-199204

SUMMARY OF THE INVENTION

Problem to be Solved by the Invention

Between the power conversion circuit such as the DC-AC conversion circuit or the DC-DC conversion circuit and the DC power supply, an LC filter circuit consisting of a reactor and a capacitor is installed in order to damp harmonic currents flowing from the power conversion circuit to the DC power supply.

However, in the electric power conversion device applied to electric vehicles, an electric oscillation is caused in the LC filter circuit by changes or the like in the voltages of the DC power supply and the overhead wire. If an overvoltage occurs across the capacitor as a result of a transient oscillation in voltage of the capacitor in the LC circuit, the electric power conversion device may not operate normally or may stop. Especially when the voltage of the DC power supply or the like suddenly and largely changes, such a malfunction is likely to occur.

The present invention is made to solve the problem described above and provides an electric power conversion device that normally operates, even when the voltage of the DC power supply or the like changes, by suppressing electric oscillations in the LC filter circuit to suppress the transient oscillation of the capacitor voltage.

Means for Solving Problem

An electric power conversion device according to the present invention includes a power conversion circuit for converting electric power received from an overhead wire through an LC filter circuit composed of a reactor and a capacitor and outputting the converted electric power; and a control unit having a delay unit including a time constant generation unit for producing a time constant according to a load quantity of the power conversion circuit and an operation unit for producing a first control signal by performing a delay operation to the voltage across the capacitor on the basis of the time constant. The control unit produces a second output voltage instruction from the first control signal and a first output voltage instruction specifying the magnitude of an output voltage of the converted power, and controls the power conversion circuit on the basis of the second output voltage instruction.

Effect of the Invention

According to the present invention, an electric power conversion device can be provided that normally operates, even when the voltage of the DC power supply or the like changes, by suppressing electric oscillations in the LC filter circuit to suppress the transient oscillation of the capacitor voltage.

EMBODIMENT TO CARRY OUT THE INVENTION

Embodiment 1

Figure 1:
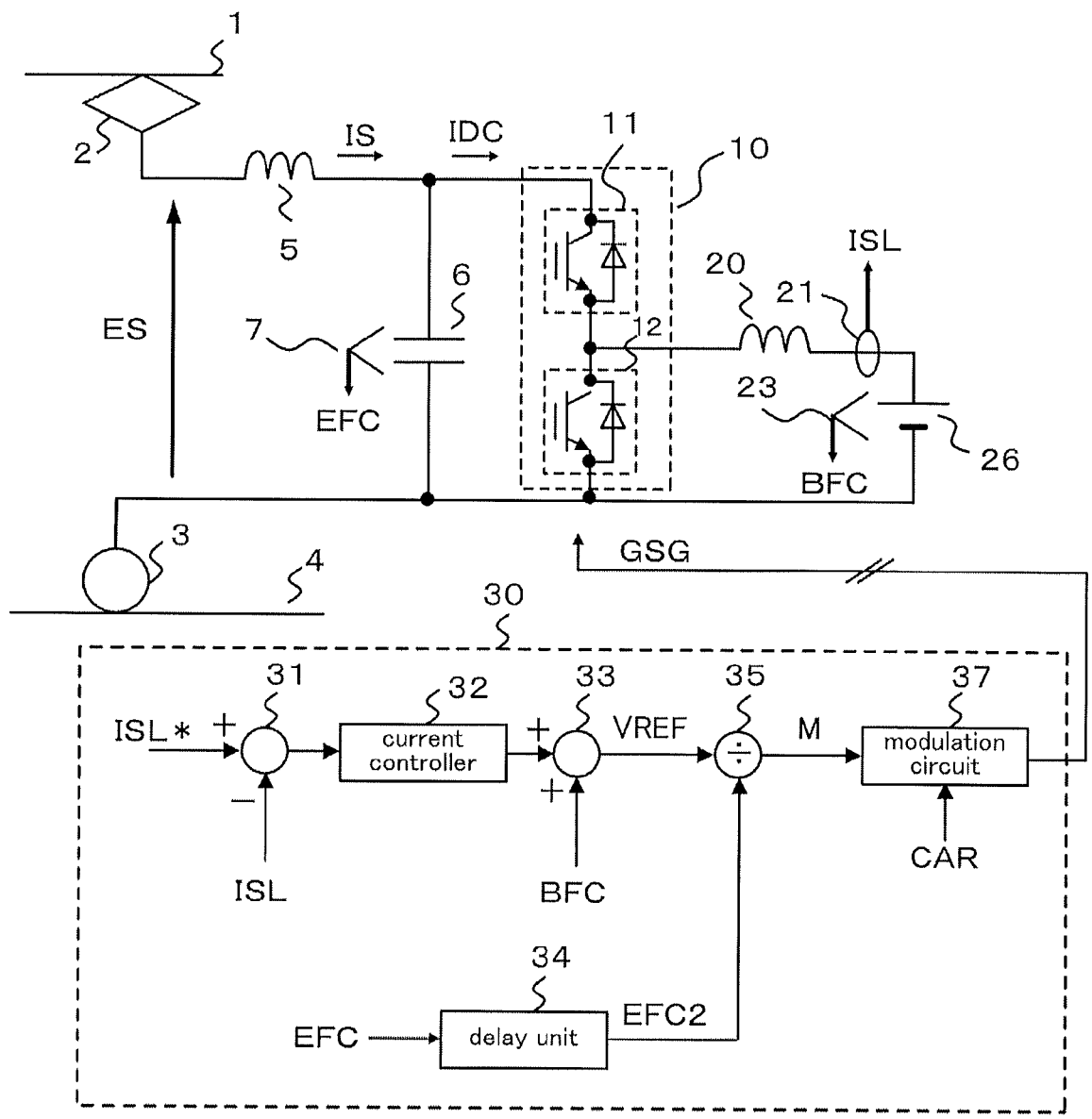
FIG. 1 is a circuit diagram illustrating a configuration example of an electric power conversion device of Embodiment 1 according to the present invention.

Embodiment 1 will be explained using figures. FIG. 1 is a circuit diagram illustrating a configuration example of an electric power conversion device of Embodiment 1 according to the present invention. The electric power conversion device is connected to an overhead wire 1 through a pantograph 2, and also connected to a rail 4 through a wheel 3. The overhead wire 1 and the rail 4 are connected to a substation serving as a DC power supply (not shown in the figures); the pantograph 2 receives electric power from the overhead wire 1, and the wheel 3 is connected to the rail 4, serving as a return path for the return current.

The electric power conversion device includes an LC filter circuit composed of a reactor 5 and a capacitor 6 for reducing harmonic currents flowing into the overhead wire 1 side, a voltage sensor 7 for sensing the DC voltage EFC of the capacitor 6, a power conversion circuit 10 connected in parallel to the capacitor 6 and composed of an upper arm switching element 11 and a lower arm switching element 12, a smoothing reactor 20 one end of which is connected to a connection point between the upper arm switching element 11 and the lower arm switching element 12, for serving as a smoothing filter filtering current ripples, a current sensor 21 for sensing the current ISL passing through the smoothing reactor 20, a power storage element 26 serving as a load, a voltage sensor 23 for sensing an output voltage BFC, and a converter controller 30 as a control unit for suppressing electric oscillations in the LC filter circuit to suppress the transient oscillation of the capacitor voltage. In this embodiment, the power conversion circuit 10 is a DC-DC conversion circuit (DC-DC converter).

A nickel hydrogen secondary battery, lithium ion secondary battery, electric double layer capacitor, or the like is suitable for the power storage element 26, but other devices may be applied. For the DC power supply, a substation has been used as an example for explanation; however, a DC voltage source other than the substation may be used.

The converter controller 30 is configured with a subtracter 31 for receiving a current instruction ISL* for the smoothing reactor 20 to make the difference between the current instruction and the smoothing reactor current ISL, a current controller 32 for receiving the output of the subtracter 31 to perform proportional-plus-integral control, an adder 33 for summing up the output of the current controller 32 and the voltage BFC of the power storage element 26 to produce a voltage instruction VREF as a first output voltage instruction specifying the magnitude of the output voltage of converted power, a divider 35 for dividing the voltage instruction VREF by a signal EFC2 serving as a first control signal to output an conduction ratio M serving as a second output voltage instruction, and a modulation circuit 37 for outputting a switching signal GSG to the power conversion circuit 10 on the basis of the conduction ratio M and a carrier signal CAR. However, the conduction ratio M may be calculated by adding a value of BFC/EFC2 to the output of the current controller 32.

If the output of the current controller 32 is small, the conduction ratio M is approximately equal to BFC/EFC (in the steady state, EFC2=EFC), and has a value between 0 through 1. For example, in a case where the voltage EFC of the capacitor 6 is 1500 V and the voltage BFC of the power storage element 26 is 600 V, the conduction ratio M becomes approximately 0.4.

The carrier signal CAR is a carrier having a waveform such as a triangle wave or a saw-tooth wave, taking its value in the range from 0 to 1. The modulation circuit 37 compares the magnitude of the conduction ratio M with that of the carrier signal CAR, to produce a switching signal GSG on the basis of the comparison result. If conduction ratio M>carrier signal CAR, the upper arm switching element 11 is turned on and the lower arm switching element 12 is turned off. If conduction ratio M<carrier signal CAR, the lower arm switching element 12 is turned on and the upper arm switching element 11 is turned off. According to the method described above, control is performed by adjusting on-time lengths of the upper arm switching element 11 and the lower arm switching element 12.

The signal EFC2 is obtained by performing a delay operation with respect to the voltage EFC of the capacitor 6 in a delay unit 34. The delay unit 34 performs operation, for example, a first-order-lag operation, with respect to the inputted voltage EFC to produce and output the signal EFC2, which is a first control signal. A significant feature of Embodiment 1 is that the conduction ratio M is calculated on the basis of the signal EFC2 produced in the delay unit 34. Proportional-plus-integral control is suitable for the current controller 32, however, proportional control may be applied. Each of the control methods can be configured by using well-known arts.

The electric power conversion device configured in this way converts a voltage ES received from the overhead wire 1 to a predetermined voltage value, applies the converted voltage to the power storage element 26 and performs on-off control of the switching elements in the power conversion circuit 10 so as to adjust the smoothing reactor current ISL (equal to the current passing through the power storage element 26) to a predetermined current value. That is, the electric power conversion device performs control so that the smoothing reactor current ISL becomes the predetermined current value.

A smoothing reactor current instruction ISL*, i.e., an instruction value for the smoothing reactor current ISL, is outputted from a supervisory control system not shown in the figure. When it is necessary to charge the power storage element 26, ISL* is has a positive value to perform a charge operation so that the power flows from the overhead wire 1 to the power storage element 26; when it is necessary to discharge the power storage element 26, ISL* has a negative value to perform a discharge operation so that the power flows from the power storage element 26 to the overhead wire 1; and when neither charge operation nor discharge operation is necessary, ISL*=0 to control the smoothing reactor current ISL to zero. In this way, according to the need of the charge operation or discharge operation, the supervisory control system determines that the current instruction ISL* takes a positive, zero, or negative value for the smoothing reactor to obtain a desired power flow.

As described before, in order to damp harmonic currents flowing from the power conversion circuit 10 into the overhead wire 1, the electric power conversion device for an electric vehicle is provided with the LC filter circuit consisting of the reactor 5 and the capacitor 6. However, the presence of the LC filter circuit sometimes causes electric oscillations as described below. How the electric oscillations are produced in the LC filter circuit will be explained below.

Figure 2:
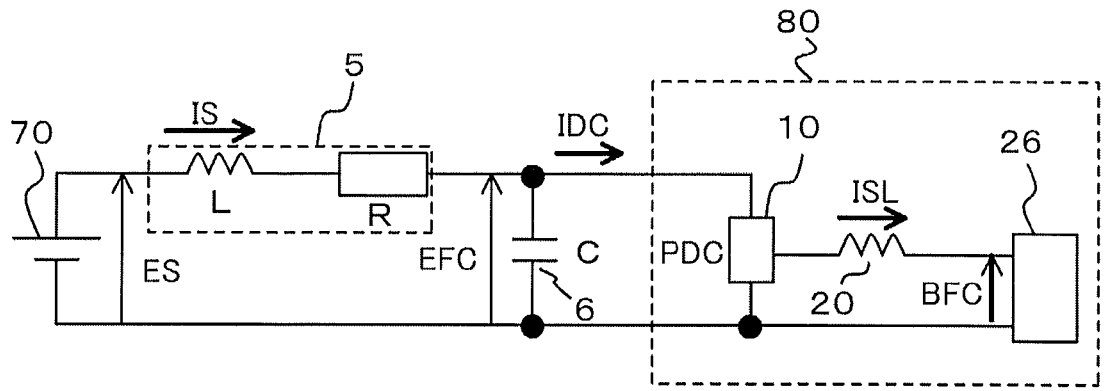
FIG. 2 is a diagram illustrating a circuit in which a constant power load is connected to an LC filter that is connected to a DC power supply.

FIG. 2 is a diagram of a system simplified in expression from that shown in FIG. 1, in which the power conversion circuit 10, the smoothing reactor 20, and the power storage element 26 are connected to the LC filter that consists of the reactor 5 and the capacitor 6 and is connected to the DC power supply 70 representing the overhead wire 1 and constant current control is performed for a smoothing reactor current ISL. As shown in the figure, the reactor 5 includes an inductance component L and a resistance component R. The capacitor 6 has a capacitance C.

When the smoothing reactor current instruction ISL* is constant, the power conversion circuit 10 is controlled so as to keep the smoothing reactor current ISL constant even when the voltage EFC of the capacitor 6 changes. Then, because the transmission power of the power conversion circuit 10 becomes constant, the power conversion circuit 10 exhibits a constant power characteristic for changes in the voltage EFC of the capacitor 6. That is, even when the voltage EFC changes, the input electric power PDC of the power conversion circuit 10 is controlled to be kept unchanged. From the above characteristic, the power conversion circuit 10, the smoothing reactor 20, and the power storage element 26 are put together into a load of the LC filter, which thereby is expressed as a constant power load 80.

In the system shown in FIG. 2 configured in this way, the constant power load 80 has a negative resistance characteristic when viewed from the side of the DC power supply 70. The negative resistance characteristic means a characteristic in which when the voltage EFC of the capacitor 6 increases, the input current IDC of the power conversion circuit 10 decreases, and when the voltage EFC of the capacitor 6 decreases, the input current IDC of the power conversion circuit 10 increases. In addition, it is known as a common sense that an ordinary resistance has a positive resistance characteristic, in which the current increases when the voltage increases, and the current decreases when the voltage decreases.

As described above, because a DC input part of the system shown in FIG. 2 has a negative resistance characteristic, as the voltage EFC of the capacitor 6 increases, the input current IDC of the power conversion circuit 10 decreases, which results in a further increase in the voltage EFC of the capacitor 6; on the other hand, as the voltage EFC of the capacitor 6 decreases, the input current IDC of the power conversion circuit 10 increases, resulting in a further reduction in the voltage EFC of the capacitor 6. Therefore, there is no damping effect on the changes in the voltage EFC of the capacitor 6, then the electric oscillation in the LC filter circuit develops to a level at which the voltage EFC of the capacitor 6 keeps oscillating at around a resonance frequency of the LC filter. This is a qualitative explanation for how the electric oscillation is produced.

Next, a quantitative explanation will be made for the phenomenon described above by obtaining the transfer function of the system shown in FIG. 2 and evaluating the transfer function. Firstly, the transfer function representing the relation between the DC voltage ES and the voltage EFC of the capacitor 6 is obtained. The constant power load 80 is controlled, as described above, so that its output is kept constant. In this case, the relational equation between input electric power PDC for the power conversion circuit 10, the voltage EFC of the capacitor 6, and the input current IDC of the power conversion circuit 10 is expressed by Equation (1) shown below.

[Equation 1]

$$EFC \times IDC = PDC (=\text{constant}) \quad (1)$$

Because the above relation is nonlinear, the equation will be linearized. Assuming that EFC0 and IDC0 denote an operating point of the system, Equation (2) shown below holds true in a neighborhood of the operating point.

[Equation 2]

$$IDC = -\frac{PDC(EFC - EFC0)}{EFC0^2} + IDC0 \quad (2)$$

Figure 3:
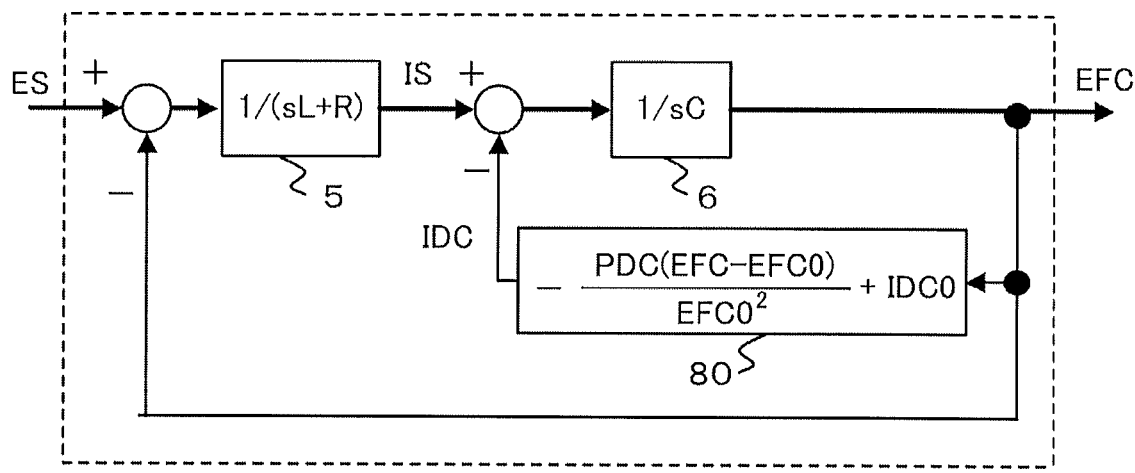
FIG. 3 is a block diagram of transfer functions that express a system illustrated in FIG. 2.

From FIG. 2 and Equation (2), the transfer function block diagram of the system shown in FIG. 2 is expressed as FIG. 3. From this transfer function block diagram, a closed-loop transfer function G(s) that relates the DC voltage ES to the voltage EFC of the capacitor 6 is given by Equation (3) shown below.

[Equation 3]

$$G(s) = \frac{\frac{1}{C \cdot L}}{s^2 + \left(\frac{R}{L} - \frac{PDC}{C \cdot EFC0^2}\right) \cdot s - \frac{1}{C \cdot L}\left(\frac{R \cdot PDC}{EFC0^2} - 1\right)} \quad (3)$$

In order to make the transfer function G(s) stable, it is necessary that all the poles of the G(s) are negative. More specifically, it is necessary that all the solutions of the characteristic equation, i.e., the denominator of G(s), expressed by Equation (4) shown below are negative.

[Equation 4]

$$s^2 + \left(\frac{R}{L} - \frac{PDC}{C \cdot EFC0^2}\right) \cdot s - \frac{1}{C \cdot L}\left(\frac{R \cdot PDC}{EFC0^2} - 1\right) = 0 \quad (4)$$

Assuming that the solutions of the above equation are α and β, the necessity that both solutions are negative leads, from the relations between the solutions and the coefficients, to Equation (5) and Equation (6) shown below to make G(s) stable.

[Equation 5]

$$\alpha + \beta = -\left(\frac{R}{L} - \frac{PDC}{C \cdot EFC0^2}\right) < 0 \quad (5)$$

[Equation 6]

$$\alpha \cdot \beta = -\frac{1}{C \cdot L}\left(\frac{R \cdot PDC}{EFC0^2} - 1\right) > 0 \quad (6)$$

Equation (6) does not include useful information, thus it will not be considered hereinafter. Equation (5) is rewritten into Equation (7) shown below.

[Equation 7]

$$R > \frac{L}{C} \cdot \frac{PDC}{EFC0^2} \quad (7)$$

From Equation (7), it is understood that a smaller value of R will suffice for the system to be stable as the L-value becomes smaller, the C-value becomes larger, the PDC-value becomes smaller, or the EFC0-value becomes larger. When a set of values, L=12 mH, C=6600 μF, PDC=1000 kW, and EFC0=1500 V, which are typical values in an electric power conversion device for electric vehicles, is given and substituted into Equation (7), this results in R>0.8 (Ω). However, in a typical electric vehicle, a resistance component is minute on the DC side, around several tens of milliohms, therefore it is difficult to meet Equation (7). Then, the system becomes unstable to cause the LC filter circuit to oscillate.

That is, it can be understood that the voltage EFC of the capacitor 6 oscillates to diverge without adding a resistance to meet the Equation (7) or performing a stabilization control.

Actually, addition of resistance will cause the device to become large and have an increase in loss, therefore a stabilization control is required.

Figure 4:
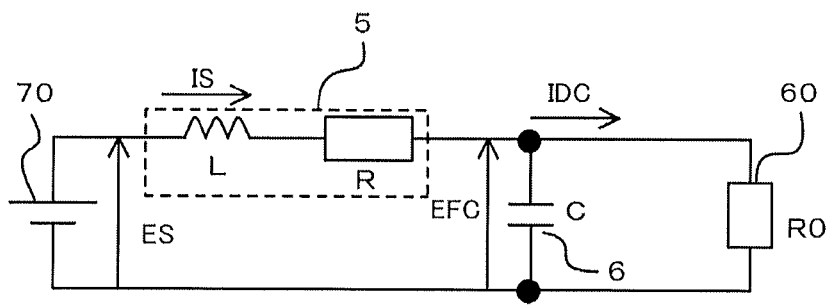
FIG. 4 is a diagram illustrating a circuit in which a positive resistance characteristic load is connected, as a comparison example, to the LC filter that is connected to the DC power supply.

At this point, in a quantitative manner similar to the above, an explanation will be made under the assumption that the load has a positive resistance characteristic. FIG. 4 is a diagram illustrating a circuit in which a load consisting of a resistance 60 is connected to an LC filter that is connected to the DC power supply 70. Compared to the circuit shown in FIG. 2, this circuit is modified in a manner that the constant power load 80 is replaced with the resistance 60. In addition, the resistance value of the resistance 60 is R0.

Figure 5:
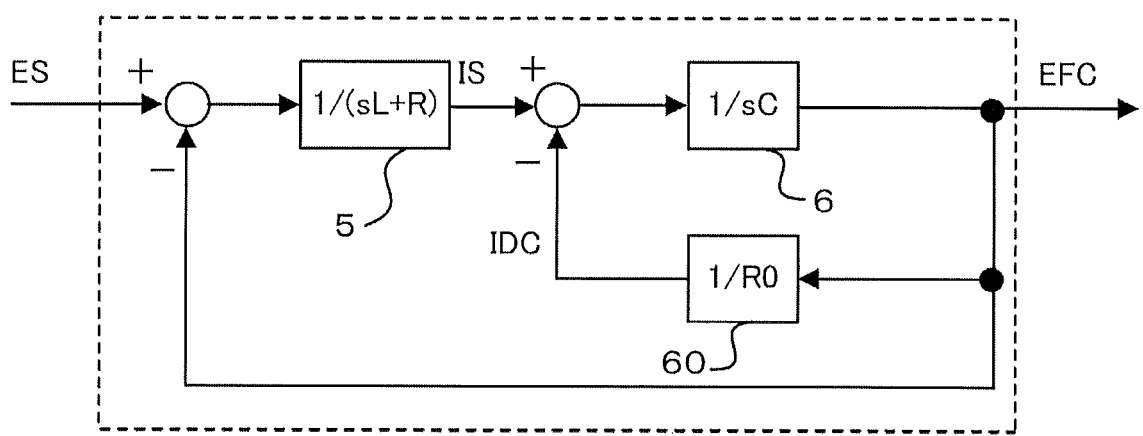
FIG. 5 is a block diagram of transfer functions that express a system illustrated in FIG. 4.

FIG. 5 is a block diagram of the system shown in FIG. 4 using the respective transfer functions. From FIG. 5, a closed-loop transfer function Gp (s) that relates the DC voltage ES of the DC power supply 70 to the voltage EFC of the capacitor 6 is given by Equation (8) shown below.

[Equation 8]

$$Gp(s) = \frac{\frac{1}{L \cdot C}}{s^2 + \left(\frac{1}{C \cdot R0} + \frac{R}{L}\right) \cdot s + \frac{1}{C \cdot L} \cdot \left(\frac{R}{R0} + 1\right)} \quad (8)$$

The characteristic equation of the closed-loop transfer function Gp(s) shown in Equation (8) is expressed by Equation (9) shown below.

[Equation 9]

$$s^2 + \left(\frac{1}{C \cdot R0} + \frac{R}{L}\right) \cdot s + \frac{1}{C \cdot L} \cdot \left(\frac{R}{R0} + 1\right) = 0 \quad (9)$$

Calculating the characteristic equation (9) similarly to the case of negative resistance reveals R≥0 for a condition that all solutions thereof have negative values. This shows that this condition is always satisfied and the system with a load consisting of the resistance 60 is always stable. As described above, the connection of the resistance 60 with the LC filter circuit connected to the DC power supply 70 always exhibits a stable operation.

In an electric power conversion device applied to electric vehicles, however, connection of a constant power load with an LC filter circuit connected to a DC power supply causes a negative resistance characteristic. Therefore, it is necessary for the system to be controlled for stabilization. There have been proposed several methods for controlling the system for stabilization, each of which controls to reduce its negative resistance characteristic described above.

However, in applications to electric vehicles, there sometimes occur sudden and large changes in the voltage of the overhead wire 1 (the overhead wire voltage ES), depending on operating conditions of other electric vehicles supplied with electric power from the common overhead wire 1. In such cases, transient oscillations occur in the voltage EFC of the capacitor 6. If the transient oscillations are suppressed insufficiently, an overvoltage occurs across the capacitor 6, sometime causing the electric power conversion device to stop. Therefore, it becomes important that when the overhead wire voltage ES suddenly and largely changes, transient oscillations in the voltage EFC of the capacitor 6 are suppressed.

In Embodiment 1, the delay unit 34 delays, as shown in FIG. 1, the voltage EFC of the capacitor 6 to produce a first control signal EFC2, and the conduction ratio M is calculated based on the signal EFC2 and the first output voltage instruction VREF. With this configuration, for example, in a case where the overhead wire voltage ES suddenly increases from a certain value so as to cause the voltage EFC of the capacitor 6 to suddenly increase, the conduction ratio M is calculated based on the signal EFC2 delayed from the voltage EFC.

In a case where the delay unit 34 is not provided as with a conventional system, the conduction ratio M immediately decreases in inverse proportion to the increase of the voltage EFC so as to be modified to a certain value according to the increased voltage EFC. In this way, the conduction ratio M is adjusted to cancel out the changes of the voltage EFC, thereby suppressing the changes in the output of the power conversion circuit 10 due to the changes of the voltage EFC. In Embodiment 1, on the other hand, transient changes in the output of the power conversion circuit 10 caused by a change in the voltage EFC are permitted to some degree, and thus the conduction ratio M behaves in a manner that it decreases to a certain value according to the increased voltage EFC, while being delayed for a certain length of time.

By operating in a manner described above, it is possible to reduce the constant power characteristic of the power conversion circuit 10 with respect to changes in the voltage EFC, and reduce the above-mentioned negative resistance characteristic, thereby stabilizing the system and also suppressing transient oscillations in the voltage EFC.

Figure 6:
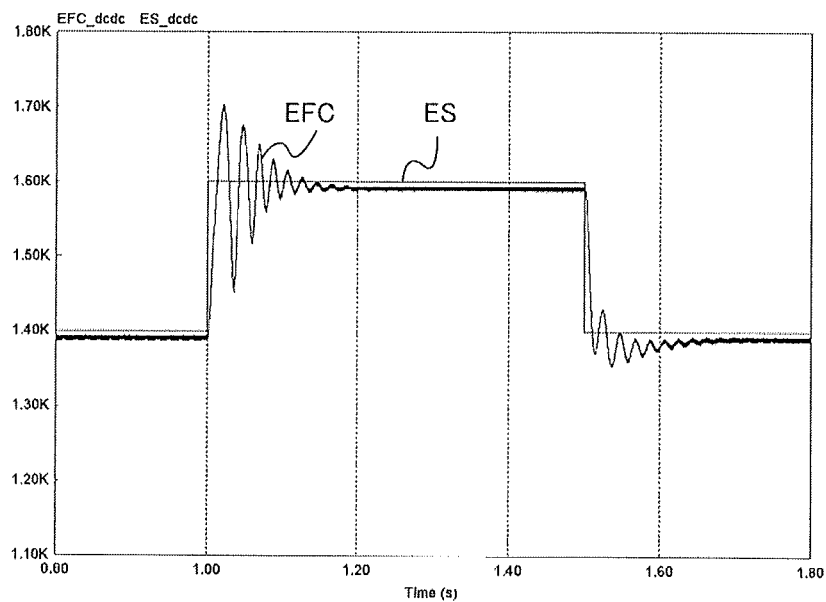
FIG. 6 is a view showing the waveforms of capacitor voltages in Embodiment 1 according to the present invention and a conventional example.
Figure 6:
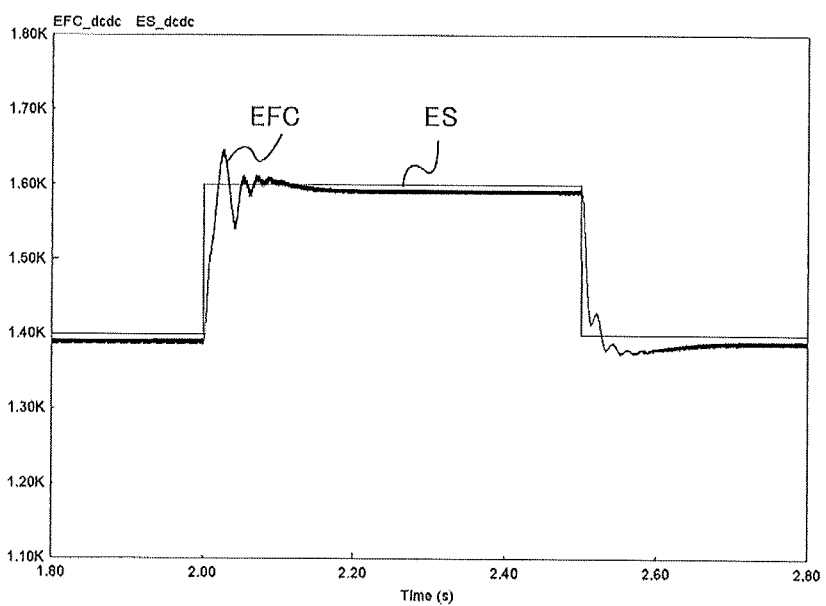

FIG. 6 is a view showing waveforms of the voltage of the capacitor, i.e., the voltage EFC, in Embodiment 1. In FIG. 6, the overhead wire voltage ES is varied step-wise from 1400 V to 1600 V during a period when electric power flows from the overhead wire 1 to the power storage element 26 to charge the power storage element 26 with the voltage of the power storage element 26 being approximately 600 V. The upper half of the figure is a waveform example for comparison, i.e., a waveform in a case where the delay unit is not provided, and the lower half of it is a waveform in a case where the delay unit 34 is provided. As shown in FIG. 6, when the delay unit is not provided, as the overhead wire voltage ES increases step-wise, the voltage EFC rises to a peak of approximately 1700 V; when the delay unit 34 is provided, on the other hand, it is found that the peak of the voltage EFC is lowered to approximately 1650 V and the transient oscillation in the voltage EFC is also suppressed.

A first-order-lag operation is suitable for the delay operation in the delay unit 34. When the first-order lag time constant is a small value, the effect of suppressing transient changes in the voltage EFC triggered by a sudden and large change in the overhead wire voltage becomes small, and when the first-order lag time constant is a large value, the effect of suppressing the transient changes in the voltage EFC becomes large. However, a too much large first-order lag time constant is not preferable, because the output voltage of the power conversion circuit is largely affected by changes in the overhead wire voltage. Therefore, it is necessary to properly determine the first-order lag time constant.

For a control device for a typical electric vehicle in which the inductance of a reactor 5 in its LC filter circuit is approximately 3 mH to 20 mH and the capacity of a capacitor 6 therein is approximately 1000 μF to 20000 μF, it is preferable that the first-order lag time constant is 10 ms to 800 ms, and more preferably 50 ms to 200 ms. For example, for the waveform shown in the lower half of FIG. 6, the reactor 5 is 10 mH and the capacitor 6 is 3000 μF, and the delay unit 34 performs a first-order-lag operation with a first-order lag time constant of 200 ms.

Note that, as described above, the higher the voltage EFC is or the smaller the input electric power PDC is, the weaker the negative resistance characteristic becomes. When the input electric power PDC is negative, Equation (7) always holds true, then resulting in an always stable system.

Figure 7:
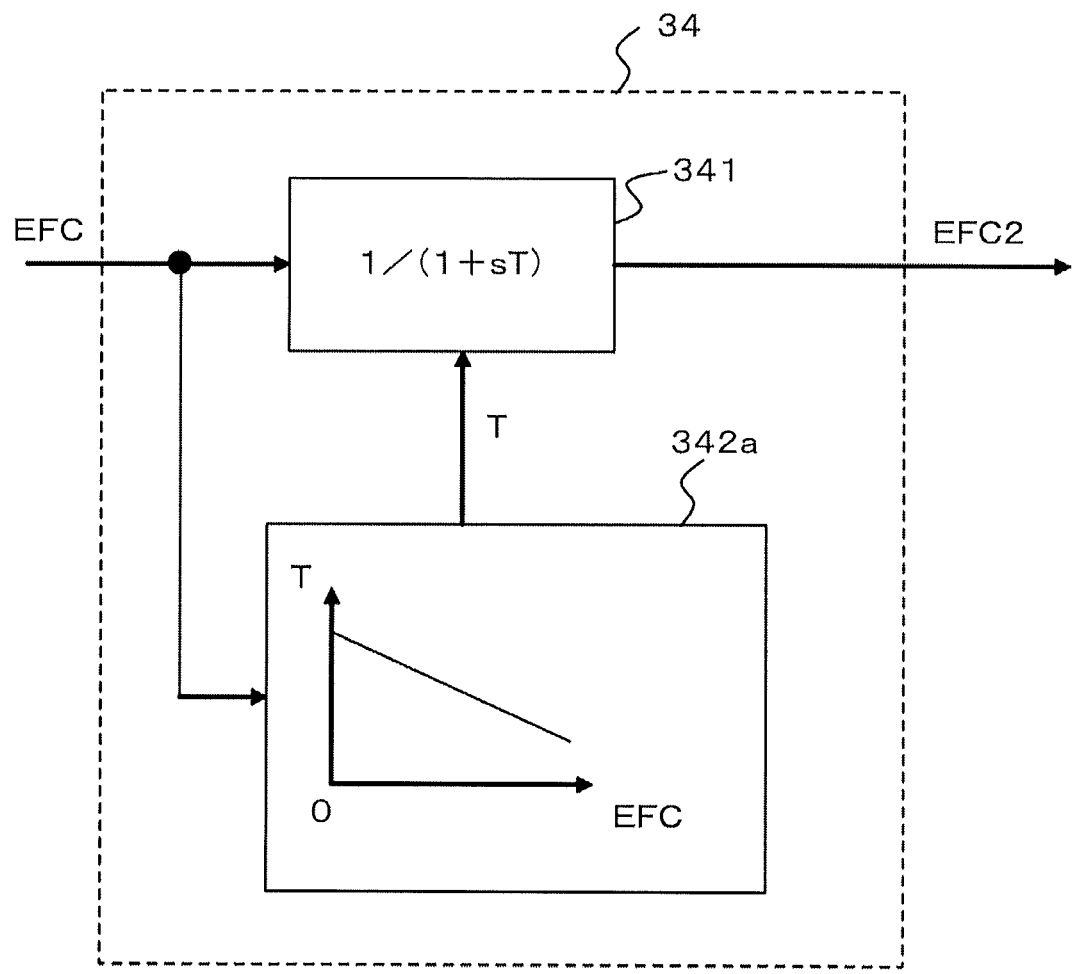
FIG. 7 is a block diagram illustrating a configuration example of a delay unit in Embodiment 1 according to the present invention.

As shown in FIG. 7, the delay unit 34 may be configured so as to include a first-order lag operation unit 341 for producing and outputting a signal EFC2 on the basis of the inputted voltage EFC, and a time constant generation unit 342a for producing a first-order lag time constant T to be set into the first-order lag operation unit 341 on the basis of the inputted voltage EFC.

The time constant generation unit 342a is preferably configured so that a first-order lag time constant T is produced on the basis of the voltage EFC, and the first-order lag time constant T produced when the voltage EFC is higher than a predetermined value is, made smaller than a first-order lag time constant T produced when the voltage EFC is lower than the predetermined value.

The first-order lag time constant T may be produced on the basis of the overhead wire voltage ES instead of the voltage EFC.

According to the above configuration, the first-order lag time constant T can be set a smaller value under the condition that the negative resistance characteristic of the system becomes weak; therefore, the system can be stabilized so as to suppress transient oscillations in the voltage EFC, while minimally suppressing transient output changes in the power conversion circuit 10 caused by changes of the overhead wire voltage ES.

Figure 8:
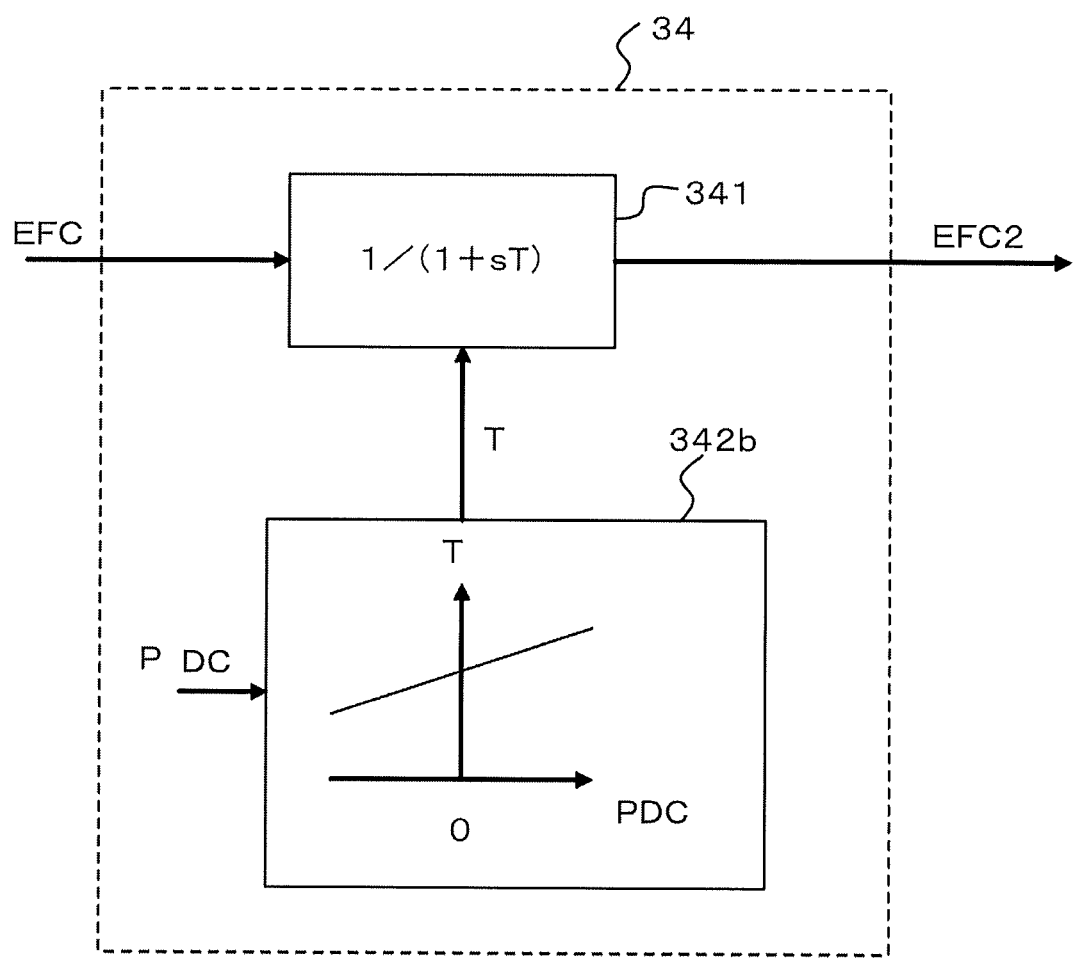
FIG. 8 is a block diagram illustrating another configuration example of the delay unit in Embodiment 1 according to the present invention.

As shown in FIG. 8, the delay unit 34 may include, as another configuration, a first-order lag operation unit 341 for producing and outputting a signal EFC2 on the basis of the inputted voltage EFC, and a time constant generation unit 342b for producing a first-order lag time constant T to be set in the first-order lag operation unit 341 on the basis of an input electric power PDC being inputted into the time constant generation unit.

The time constant generation unit 342b is preferably configured so that a first-order lag time constant T is produced on the basis of the input electric power PDC, and the first-order lag time constant T produced when the input electric power PDC is smaller than a predetermined value, that is, when the conversion power of the power conversion circuit 10 is small, is made smaller than a first-order lag time constant T produced when the input electric power PDC is larger than the predetermined value.

The time constant generation unit may be configured so that the first-order lag time constant T is produced, basing on the input electric power PDC, the input current IS, the current or electric power passing through the power conversion circuit 10, the output current ISL or output electric power, or the like (collectively referred to as a load quantity).

According to the above configuration, the first-order lag time constant T can be set as a small value under the condition that the negative resistance characteristic of the system becomes weak or the system is stable; therefore, the system can be stabilized so as to suppress transient oscillations in the voltage EFC, while minimizing transient output changes in the power conversion circuit 10 caused by changes of the overhead wire voltage ES.

That is, by applying a configuration in which a first-order lag time constant T is produced on the basis of an input-side voltage of the electric power conversion device 10 such as a filter-capacitor voltage EFC or an overhead wire voltage ES, and a state quantity of the power conversion circuit device 10 such as the load quantity of the electric power conversion device 10, the first-order lag time constant T can be set as a small value under the condition that the negative resistance characteristic of the system becomes weak or the system is stable; therefore, the system can be stabilized so as to suppress transient oscillations in the voltage EFC, while minimizing transient output changes in the power conversion circuit 10 caused by changes of the overhead wire voltage ES.

In Embodiment 1, by providing, as described above, the converter controller 30 with the delay unit 34, electrical oscillations in the LC filter circuit of a DC-DC converter, i.e., the power conversion circuit 10, can be suppressed so as to suppress transient oscillations in the capacitor voltage EFC. Therefore, this suppresses overvoltages in the capacitor to maintain normal operations of the electric power conversion device, even when the voltage of the DC power supply such as the overhead wire voltage suddenly and largely changes.

Embodiment 2

In Embodiment 1, the explanation has been made for a case where a DC-DC converter is used as the power conversion circuit 10; in Embodiment 2, an explanation will be made for a case where a DC-AC conversion circuit (inverter) is used. In a case where a motor is controlled to be driven by a DC-AC conversion circuit, a negative resistance characteristic is also produced on the input side of the power conversion circuit based on the principle explained in Embodiment 1.

Figure 9:
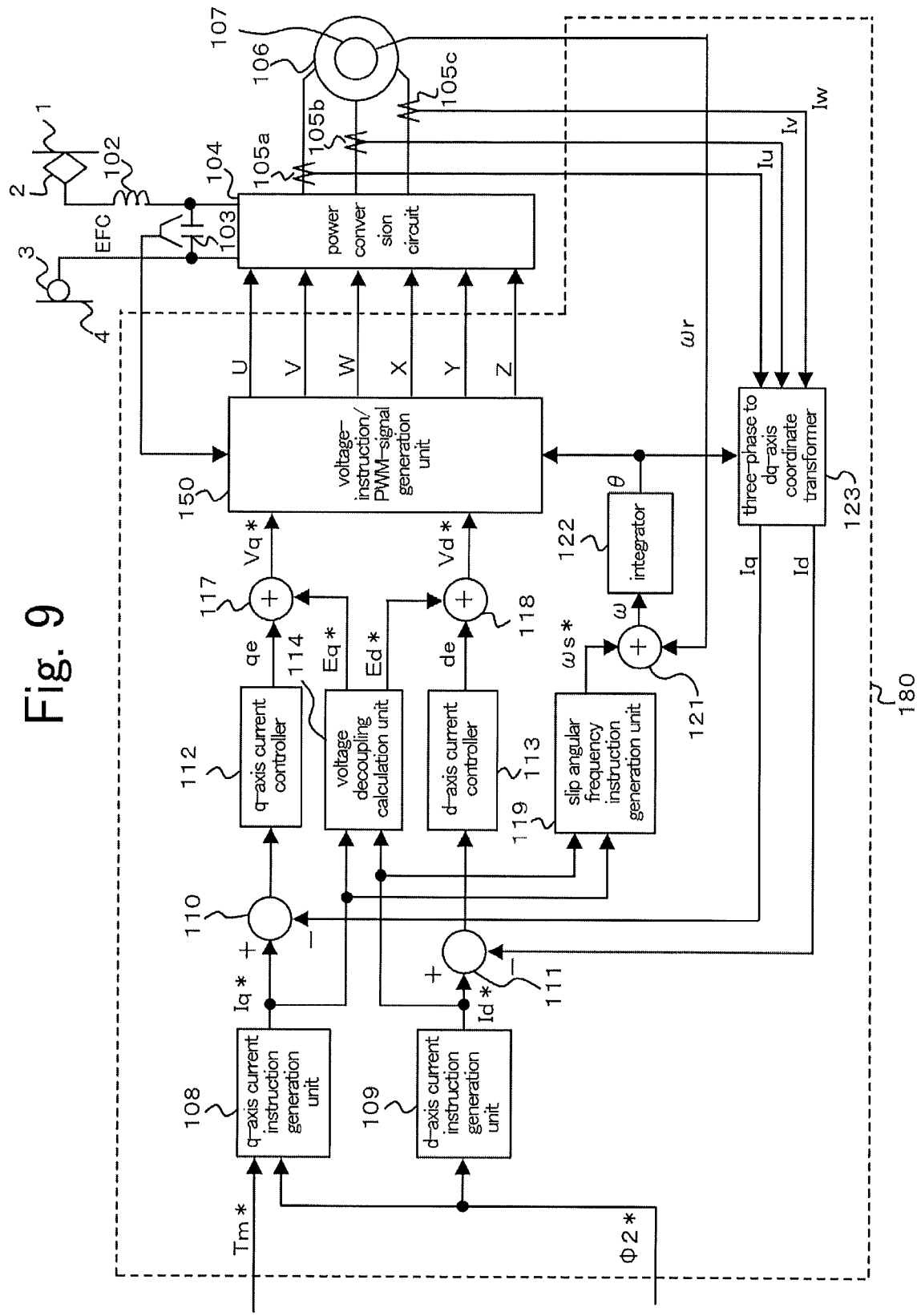
FIG. 9 is a block diagram illustrating a configuration of an electric power conversion device of Embodiment 2 according to the present invention.

FIG. 9 is a block diagram illustrating a configuration of an electric power conversion device in Embodiment 2. The electric power conversion device is connected to an overhead wire 1 through a pantograph 2, and also connected to a rail 4 through a wheel 3. The overhead wire 1 and the rail 4 are connected to a substation serving as a DC power supply (not shown in the figures); the pantograph 2 receives electric power from the overhead wire 1, and the wheel 3 is connected to the rail 4, serving as a return path for the return current.

The electric power conversion device includes, an inverter 104 for converting, as a power conversion circuit, a DC voltage to AC voltages with an arbitrary frequency, an LC filter circuit consisting of a reactor 102 and a capacitor 103 for reducing a harmonic current flowing from the inverter 104 to a power source side, and an inverter controller 180 for controlling, as a control unit, the inverter 104 that converts the voltage EFC of the capacitor 103 to the AC voltages.

The inverter controller 180 is configured to have inputs: a signal from a speed sensor 107 sensing the rotation speed of a motor 106; signals from current sensors 105a to 105c sensing currents of the motor; the voltage EFC of the capacitor 103; and a torque instruction Tm* from an external control device (not shown in the figure), and control the torque Tm produced by the motor 106 so that the torque becomes equal to the torque instruction Tm*. In addition, it is not always necessary that current sensors are provided to three phases; current sensors may be provided to two phases and the current of the remaining phase may be calculated. On the other hand, a speed-sensorless control method in which the rotation speed of the motor 106 is calculated without providing the speed sensor 107 is put to practical use. If the method is applied to this embodiment, the speed sensor 107 is not needed.

Next, the configuration of the inverter controller 180 will be explained. The inverter controller 180 has a so-called "vector control" configuration to control the motor in a dq-axis rotating coordinate system in which a d-axis is defined as an axis coinciding with the secondary magnetic flux axis of the motor 106, and a q-axis is defined as an axis orthogonal to the d-axis.

Explanations will be made for respective components in the inverter controller 180 below. As shown in FIG. 9, a q-axis current instruction generation unit 108 and a d-axis current instruction generation unit 109 calculate using Equations (10) and (11) shown below, a d-axis (excitation component) current instruction Id* and a q-axis (torque component) current instruction Iq* from a torque instruction Tm*, a secondary flux instruction Φ2* inputted from an external control device (not shown in the figure) and circuit constants of the motor 106.

In Equations (10) and (11), L2 is a secondary self inductance of the motor and expressed by L2=M+l2, M is a mutual inductance, l2 is a secondary leakage inductance, s is a differential operator, PP is the number of pole pairs of the motor 106, and R2 is a secondary resistance of the motor 106.

[Equation 10]

$$Iq^* = (Tm^*/(\phi 2^* \cdot PP)) \cdot (L2/M) \tag{10}$$

[Equation 11]

$$Id^* = \phi 2^*/M + L2/(M \cdot R2) \cdot s\phi 2^* \tag{11}$$

Next, a slip angular frequency instruction generation unit 119 calculates using Equation (12) shown below, a slip angular frequency instruction ωs* for the motor 106 from the d-axis current instruction Id*, the q-axis current instruction Iq*, and circuit constants of the motor 106. Here, R2 is the secondary resistance of the motor.

[Equation 12]

$$\omega s^* = (Iq^*/Id^*) \cdot (R2/L2) \tag{12}$$

An adder 121 adds the slip angular frequency instruction ωs* calculated from Equation (12) to a rotation angular frequency ωr which is the output of the speed sensor 107 provided at the shaft end of the motor 106, thereby producing an inverter angular frequency ω, i.e., the output frequency of the inverter 104. The inverter angular frequency ω is integrated by an integrator 122, and the integrated result is inputted as a base phase angle θ for coordinate transformation into a voltage-instruction/PWM-signal generation unit 150 (described later) and a three-phase to dq-axis coordinate transformer 123.

The three-phase to dq-axis coordinate transformer 123 converts a U-phase current Iu, V-phase current Iv, and W-phase current Iw measured by sensors 105a through 105c into a d-axis current Id and a q-axis current Iq in the dq-axis coordinate, using Equation (13) shown below.

[Equation 13]

$$\begin{pmatrix} Iq \\ Id \end{pmatrix} = \sqrt{\frac{2}{3}} \begin{pmatrix} \cos\theta & \cos(\theta - \frac{2}{3}\pi) & \cos(\theta + \frac{2}{3}\pi) \\ \sin\theta & \sin(\theta - \frac{2}{3}\pi) & \sin(\theta + \frac{2}{3}\pi) \end{pmatrix} \begin{pmatrix} IU \\ IV \\ IW \end{pmatrix} \tag{13}$$

Next, a subtracter 110 calculates the difference between the q-axis current instruction Iq* and the q-axis current Iq, then, the subtraction result is inputted into the following block, a q-axis current controller 112. The q-axis current controller 112 performs proportional-plus-integral control for the inputted value to output a q-axis voltage compensation value qe. A subtracter 111 also calculates the difference between the d-axis current instruction Id* and the d-axis current Id to input the result into the next block, a d-axis current controller 113. The d-axis current controller 113 performs proportional-plus-integral control for the inputted value to output a d-axis voltage compensation value de. The q-axis voltage compensation value qe and the d-axis voltage compensation value de are expressed by Equations (14) and (15) shown below. In the equations, s is a differential operator, K1 is a proportional gain, and K2 is an integral gain.

[Equation 14]

$$qe = (K1 + K2/s) \cdot (Iq^* - Iq) \tag{14}$$

[Equation 15]

$$de = (K1 + K2/s) \cdot (Id^* - Id) \tag{15}$$

Next, a voltage decoupling calculation unit 114 calculates a d-axis feed forward voltage Ed* and a q-axis feed forward voltage Eq* from the d-axis current instruction Id*, the q-axis current instruction Iq*, and circuit constants of the motor 106, using Equations (16) and (17) shown below. It is noted that a leakage coefficient σ is defined as σ=1−M/(L1·L2) in Equations (16) and (17). Furthermore, R1 represents a primary resistance of the motor 106; L1 represents a primary self inductance of the motor 106 and is calculated by L1=M+l1; and L2 is a secondary self inductance and is calculated by L2=M+l2 (l1 is a primary leakage inductance, l2 is a secondary leakage inductance).

[Equation 16]

$$Ed^* = (R1 + s \cdot L1 \cdot \sigma) \cdot Id^* - \omega \cdot L1 \cdot \sigma \cdot Iq^* - (M/L2) \cdot s\phi 2^* \tag{16}$$

[Equation 17]

$$Eq^* = (R1 + s \cdot L1 \cdot \sigma) \cdot Iq^* + \omega \cdot L1 \cdot \sigma \cdot Id^* + (\omega \cdot M \cdot \phi 2^*)/L2 \tag{17}$$

Next, an adder 117 adds the q-axis voltage compensation value qe to the q-axis feed forward voltage Eq* to produce a q-axis voltage instruction Vq*, an adder 118 adds the d-axis voltage compensation value de to the d-axis feed forward voltage Ed* to produce a d-axis voltage instruction Vd*, and the respective addition results are inputted into a voltage-instruction/PWM-signal generation unit 150. The q-axis voltage instruction Vq* and the d-axis voltage instruction Vd* are expressed by Equations (18) and (19) below.

[Equation 18]

$$Vq^* = Eq^* + qe \tag{18}$$

[Equation 19]

$$Vd^* = Ed^* + de \tag{19}$$

In addition, an inverter output voltage instruction VM*, which is a first output voltage instruction, is expressed by Equation (20) shown below. Here, VM* expresses the magnitude of the inverter output voltage instruction vector.

[Equation 20]

$$VM^* = \sqrt{Vd^{*2} + Vq^{*2}} \tag{20}$$

Finally, the voltage-instruction/PWM-signal generation unit 150 outputs gate signals to switching elements U to Z (not shown in the figure) in the inverter 104. The inverter 104 is a publicly-known voltage source PWM inverter; thus, detail explanations thereof will be omitted. However a partial explanation will be made as follows. The switching elements U, V, and W are arranged on U-phase, V-phase, and W-phase of upper arms in the inverter 104, and the switching elements X, Y, and Z are arranged on U-phase, V-phase, and W-phase of lower arms in the inverter 104.

Figure 10:
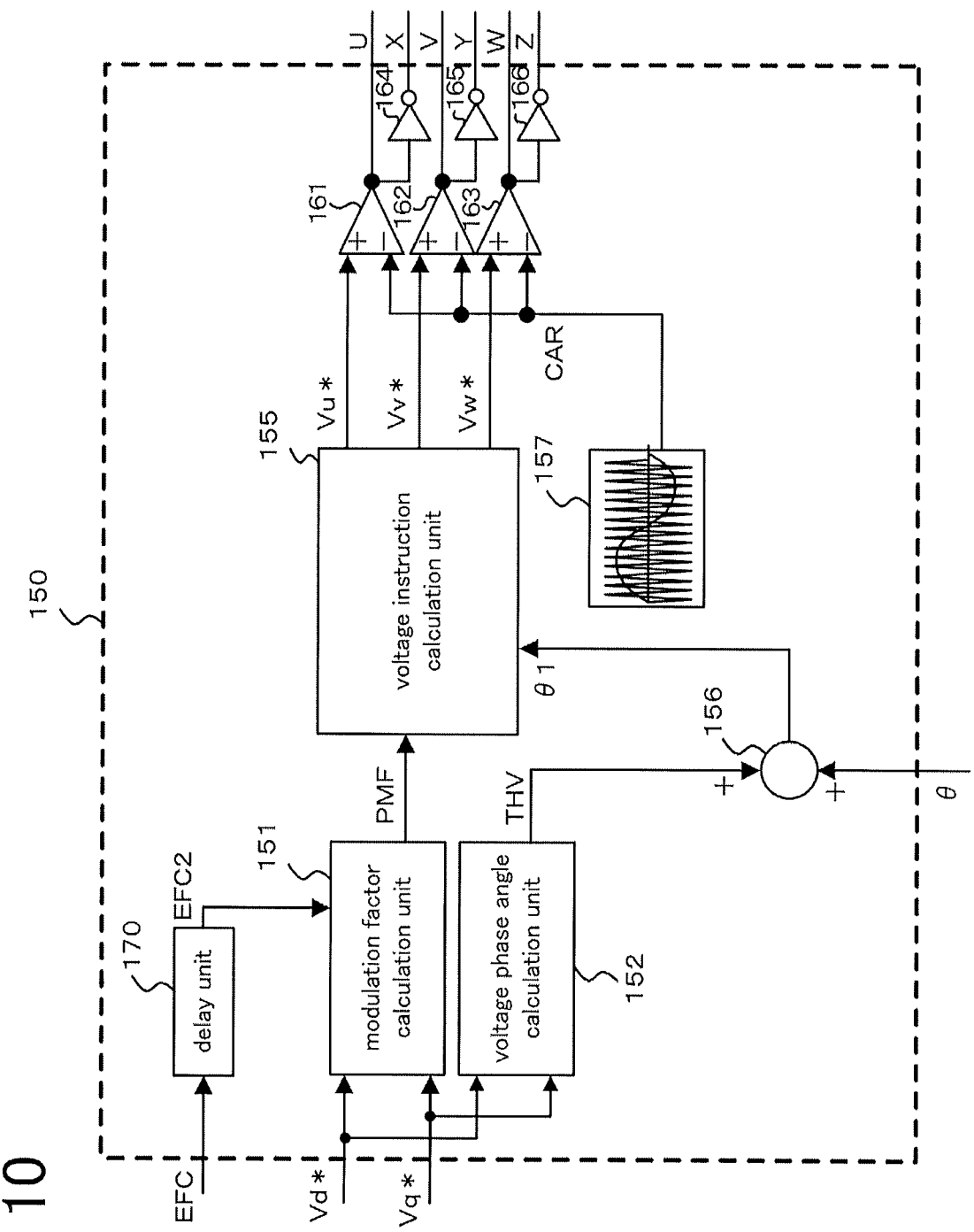
FIG. 10 is a block diagram illustrating a configuration example of a voltage-instruction/PWM-signal generation unit in Embodiment 2 according to the present invention.

Next, the configuration of the voltage-instruction/PWM-signal generation unit 150 will be explained. FIG. 10 is a block diagram illustrating a configuration example of a voltage-instruction/PWM-signal generation unit 150 in Embodiment 2. A delay unit 170 receives the capacitor voltage EFC and outputs a signal EFC2. A modulation factor calculation unit 151 calculates a modulation factor PMF, i.e., a second output voltage instruction for specifying the magnitude of the AC output voltage, from the signal EFC2, the q-axis voltage instruction Vq*, and the d-axis voltage instruction Vd*. A voltage phase angle calculation unit 152 calculates a voltage phase angle THV, i.e., an instruction for specifying the phase angle of the AC output voltage, from the q-axis voltage instruction Vq* and the d-axis voltage instruction Vd*.

The modulation factor PMF is a ratio of the inverter output voltage instruction VM* to the maximum voltage VMmax that the inverter can output; then, when PMF=1.0, it means that the inverter output voltage instruction VM* becomes equal to the maximum voltage VMmax of the inverter output.

The modulation factor calculation unit 151 and the voltage phase angle calculation unit 152 perform calculation of Equations (21) and (22), respectively.

[Equation 21]

$$PMF = \frac{VM*}{VMmax} \quad (21)$$

[Equation 22]

$$THV = \tan^{-1} \cdot \frac{Vq*}{Vd*} \quad (22)$$

Here, the maximum value VMmax of the inverter output voltage is calculated from Equation (23) shown below, on the basis of the signal EFC2.

[Equation 23]

$$VMmax = \frac{\sqrt{6}}{\pi} \cdot EFC2 \quad (23)$$

VMmax is the maximum voltage that the inverter 104 can output when the value of the voltage EFC of the capacitor 103 becomes equal to the value of the signal EFC2, and is the value that the inverter 104 outputs when performing one-pulse mode so as to conduct in a rectangular wave form.

As with the configuration explained in Embodiment 1, the signal EFC2 is a signal obtained by delaying the capacitor voltage EFC with the delay unit 170. That is, the delay unit 170 performs a delay operation, for example, a first-order-lag operation, to the inputted voltage EFC to produce and output the signal EFC2, which is the first control signal. In Embodiment 2, a feature is that a modulation factor PMF, which is a second output voltage instruction, is calculated on the basis of the signal EFC2 produced by the delay unit 170.

An adder 156 adds the voltage phase angle THV to the base phase angle θ to produce a control phase angle θ1, and the control phase angle θ1 is inputted to a voltage instruction calculation unit 155. The modulation factor PMF is also inputted to the voltage instruction calculation unit 155. From the modulation factor PMF and the control phase angle θ1, the voltage instruction calculation unit 155 produces, using Equations (24) to (26), a U-phase voltage instruction Vu*, a V-phase voltage instruction Vv*, and a W-phase voltage instruction Vw*, which are three phase output voltage instructions.

[Equation 24]

$$Vu* = PMF \cdot \sin\theta 1 \quad (24)$$

[Equation 25]

$$Vv* = PMF \cdot \sin\left(\theta 1 - \frac{2\pi}{3}\right) \quad (25)$$

[Equation 26]

$$Vw* = PMF \cdot \sin\left(\theta 1 - \frac{4\pi}{3}\right) \quad (26)$$

The U-phase voltage instruction Vu*, the V-phase voltage instruction Vv*, and the W-phase voltage instruction Vw* are compared in magnitude to a carrier signal CAR by comparators 161 to 163 to produce gate signals U, V, and W, respectively. The U-phase voltage instruction Vu*, the V-phase voltage instruction Vv*, and the W-phase voltage instruction Vw* are compared in magnitude to the carrier signal CAR by the comparators 161 to 163. The comparison result signals each pass inverting circuits 164 to 166 to produce gate signals X, Y, and Z. Here, the carrier signal CAR is a triangle-wave-shaped carrier signal produced by a carrier signal production unit 157.

The on/off (switching) states of the switching elements in the inverter 104 are controlled based on the gate signals U, V, W, X, Y, and Z. Both the modulation factor PMF and the voltage phase angle THV are calculated on the basis of the q-axis voltage instruction Vq* and the d-axis voltage instruction Vd*; however, as described above, only the modulation factor PMF is calculated additionally based on the signal EFC2. The voltage phase angle THV is produced, as described above, only from the q-axis voltage instruction Vq* and the d-axis voltage instruction Vd*, and the adjustments or the like are not performed on the basis of the signal EFC2. In addition, it has been confirmed that a method of adjusting the voltage phase angle THV on the basis of the signal EFC2 significantly deteriorates the control performance of the motor 106.

Therefore, as has been described above, it is preferable to provide a configuration in which an inverter output voltage instruction VM*, which is a first output voltage instruction, is calculated from a q-axis voltage instruction Vq* and a d-axis voltage instruction Vd*, and a modulation factor PMF, i.e., a second output voltage instruction for specifying the magnitude of the AC output voltage, is calculated from the inverter output voltage instruction VM* and a signal EFC2, and a configuration in which a voltage phase angle THV, i.e., an instruction for specifying the phase angle of the AC output voltage, is calculated from the q-axis voltage instruction Vq* and the d-axis voltage instruction Vd*, and to produce three phase output voltage instructions Vu*, Vv*, and Vw* on the basis of the calculated modulation factor PMF and the voltage phase angle THV. As configured above, when the overhead wire voltage ES, for example, suddenly increases and then the capacitor voltage EFC increases accordingly, the modulation factor PMF is calculated on the basis of the signal EFC2 which is produced by delaying the voltage EFC.

In a case where the delay unit 170 is not provided as with a conventional system, the modulation factor PMF immediately decreases in inverse proportion to the increase of the voltage EFC so as to be modified to a certain value according to the voltage EFC. In this way, the modulation factor PMF is adjusted by canceling out the changes of the voltage EFC, so that the output of the power conversion circuit 104 is not influenced by the changes of the voltage EFC. In Embodiment 2, on the other hand, transient changes in the output of the power conversion circuit 104 caused by a change in the voltage EFC are permitted to some degree, and thus the modulation factor PMF behaves in a manner that it decreases to a certain value decided on the basis of the changed voltage EFC, while being delayed for a certain length of time.

By operating the inverter controller in a manner described above, the constant power characteristic in the power conversion circuit 104 with respect to changes in the voltage EFC can be reduced similarly to the case explained in Embodiment 1, and thus the negative resistance characteristic can be reduced, thereby stabilizing the system and suppressing transient oscillations in the voltage EFC.

For the delay operation in the delay unit 170, a first-order-lag operation is suitable. A small first-order lag time constant leads to less suppression effect for transient changes in the voltage EFC caused by a sudden and large change in the overhead wire voltage, and a large first-order lag time constant leads to much suppression effect for transient changes in the voltage EFC. However, a too large first-order lag time constant is undesirable because it causes the output voltages of the power conversion circuit to be largely affected by changes in the overhead wire voltage. Thus, it is necessary to appropriately determine the first-order lag time constant.

In a control device for a typical electric vehicle that is provided with a reactor 102 of about 3-20 mH and a capacitor 103 of about 1000-20000 µF as its LC filter circuit, its first-order lag time constant is preferably 10-800 ms, and 50-200 ms is more preferable.

In the configuration of Embodiment 2, it is also the same as Embodiment 1 that the higher the voltage EFC and the smaller the input electric power PDC, the more reduced the negative resistance characteristic. When the input electric power PDC is negative, the system is always stable.

It is preferable that the delay unit 170 has the same inner configuration as that of the delay unit 34 explained in Embodiment 1. That is, the delay unit 170 in Embodiment 2 has the same configuration as that shown in FIG. 7 and FIG. 8 explained in Embodiment 1, thus the explanations thereof are omitted.

If the delay unit 170 has the configuration shown in FIG. 8, the first-order lag time constant T in the time constant generation unit 342b may be produced on the basis of, instead of the electric power PDC, a load quantity related to the input electric power PDC such as the input current IS, the current or electric power passing through the power conversion circuit 104, the output current or output electric power, or the input torque of the motor 106.

According to the above configuration, the first-order lag time constant T can be set as a small value under the condition that the negative resistance characteristic of the system becomes weak or the system is stable; therefore, the system can be stabilized so as to suppress transient oscillations in the voltage EFC, while minimizing transient output changes in the power conversion circuit 104 caused by changes of the overhead wire voltage ES.

That is, the first-order lag time constant T can be set as a small value by configuring to produce, under the condition that the negative resistance characteristic of the system becomes weak or the system is stable, the first-order lag time constant T on the basis of a state quantity of the power conversion circuit such as the filter capacitor voltage EFC, the overhead wire voltage ES, or the load quantity; therefore, the system can be stabilized so as to suppress transient oscillations in the voltage EFC, while minimizing transient output changes in the power conversion circuit 104 caused by changes of the overhead wire voltage ES.

In Embodiment 2, the voltage-instruction/PM-signal generation unit 150 in the inverter controller 180 is provided, as described above, with the delay unit 170; therefore, electrical oscillations in the LC filter circuit for the inverter, i.e., the power conversion circuit 104, can be suppressed, and transient oscillations in the capacitor voltage can be suppressed. Therefore, even when the voltage of a DC power supply such as the overhead wire voltage suddenly and largely changes, an overvoltage in the capacitor 6 can be suppressed to maintain normal operations of the electric power conversion device.

In Embodiment 2, the explanation has been made using a case where an induction motor is used as the motor 106; however, other motors such as a synchronous motor can be used in the present invention. As the DC power supply, a substation to which the overhead wire 1 is connected has been exemplified; however, batteries and generators can be similarly used as the DC power supply.

Each of the configurations explained in Embodiments 1 and 2 is just an example of the present invention, and it is obvious that various changes may be made without departing from the scope of the present invention.

NUMERALS

5 reactor
6 capacitor
10 power conversion circuit (DC-DC converter)
30 converter controller
34 delay unit
102 reactor
103 capacitor
104 power conversion circuit (inverter)
150 voltage-instruction/PWM-signal generation unit
170 delay unit
180 inverter controller
341 first-order lag operation unit
342a, 342b time constant generation unit

What is claimed is:

1. An electric power conversion device that includes a power conversion circuit for converting electric power received from an overhead wire through an LC filter circuit composed of a reactor and a capacitor and outputting the converted electric power; and a control unit having a delay unit including a time constant generation unit for producing a time constant according to a load quantity of the power conversion circuit and an operation unit for producing a first control signal by performing a delay operation to the voltage across the capacitor on the basis of the time constant, the control unit producing a second output voltage instruction from the first control signal and a first output voltage instruction specifying the magnitude of an output voltage of the converted power, and controlling the power conversion circuit on the basis of the second output voltage instruction wherein the load quantity is at least one of an input electric power, an input current, an output current, an output electric power of the electric power device.

2. The electric power conversion device according to claim 1, wherein when the load quantity is smaller than a predetermined value, the time constant produced by the delay unit is smaller than a time constant produced by the delay unit when the load quantity is larger than the predetermined value.

3. The electric power conversion device according to claim 2,
wherein the power conversion circuit is an inverter in which the input is DC and the output is AC, and
wherein the first output voltage instruction is an instruction specifying the magnitude of the AC output voltage in the AC electric power outputted by the inverter,
the control unit produces a voltage phase angle that is an instruction for the voltage phase angle of the AC output voltage, and controls the inverter on the basis of the second output voltage instruction and the voltage phase angle.

4. The electric power conversion device according to claim 1,
wherein the power conversion circuit is an inverter in which the input is DC and the output is AC, and
wherein the first output voltage instruction is an instruction specifying the magnitude of the AC output voltage in the AC electric power outputted by the inverter, the control unit produces a voltage phase angle that is an instruction for the voltage phase angle of the AC output voltage, and controls the inverter on the basis of the second output voltage instruction and the voltage phase angle.

* * * * *